United States Patent
Tashiro

(10) Patent No.: US 10,954,871 B2
(45) Date of Patent: Mar. 23, 2021

(54) CONTROL UNIT OF INTERNAL COMBUSTION ENGINE

(71) Applicant: DENSO CORPORATION, Kariya (JP)

(72) Inventor: Makoto Tashiro, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/802,728

(22) Filed: Feb. 27, 2020

(65) Prior Publication Data

US 2020/0291878 A1 Sep. 17, 2020

(30) Foreign Application Priority Data

Mar. 15, 2019 (JP) .............................. JP2019-048963

(51) Int. Cl.
 *F02D 41/00* (2006.01)
 *F02D 41/38* (2006.01)
 *F01N 11/00* (2006.01)

(52) U.S. Cl.
 CPC .......... *F02D 41/009* (2013.01); *F01N 11/007* (2013.01); *F02D 41/38* (2013.01)

(58) Field of Classification Search
 CPC ....... F02D 41/009; F02D 41/38; F01N 11/007
 USPC ....................................................... 701/103
 See application file for complete search history.

(56) References Cited

U.S. PATENT DOCUMENTS

| | | | | |
|---|---|---|---|---|
| 2001/0024286 | A1* | 9/2001 | Eom ................... | G11B 20/1217 358/1.5 |
| 2002/0050272 | A1* | 5/2002 | Yonezawa ............. | F02D 41/009 123/406.62 |
| 2005/0027430 | A1* | 2/2005 | Amano ................... | F02D 37/02 701/105 |
| 2016/0280018 | A1* | 9/2016 | Kosugi ............... | B60C 23/0416 |
| 2017/0175660 | A1* | 6/2017 | Pursifull ................. | F02D 41/34 |
| 2019/0323986 | A1* | 10/2019 | Solanskey .......... | G01N 27/4077 |

FOREIGN PATENT DOCUMENTS

JP 3517951 B2 4/2004

* cited by examiner

*Primary Examiner* — Joseph J Dallo
*Assistant Examiner* — Yi-Kai Wang
(74) *Attorney, Agent, or Firm* — Posz Law Group, PLC

(57) ABSTRACT

A controller of an internal combustion engine includes a sensor, a control unit controlling the engine, and a detector obtaining detection data from the sensor and transmitting the data to the control unit. The detector includes a detection data obtainer obtaining the detection data and storing the detection data in a storage upon having an input of a trigger signal, and a detection data transmitter transmitting the detection data stored in the storage to the control unit, and the control unit includes a trigger output unit outputting the trigger signal at a certain rotation angle timing of the internal combustion engine, and a detection data receiver obtaining the detection data from the detector.

5 Claims, 4 Drawing Sheets

CONTROL UNIT OF INTERNAL COMBUSTION ENGINE

CROSS REFERENCE TO RELATED APPLICATION

The present application is based on and claims the benefit of priority of Japanese Patent Application No. 2019-048963, filed on Mar. 15, 2019, the disclosure of which is incorporated herein by reference.

TECHNICAL FIELD

The present disclosure generally relates to a controller that controls an operation of an internal combustion engine in synchronization with the rotation of the internal combustion engine.

BACKGROUND INFORMATION

In an internal combustion engine, the fuel injection amount and ignition timing must be controlled in synchronization with the rotation of the internal combustion engine. Therefore, detection data used for such control of the internal combustion engine may be required to be detected at a predetermined rotation angle timing of the internal combustion engine using a sensor.

Therefore, in this type of related art controller, various sensors provided in the internal combustion engine are classified into two types for high-speed communication and for low-speed communication, and the sensors for high-speed communication are configured to transmit detection data at a predetermined timing in synchronization with the rotation of the internal combustion engine. Note that, in the proposed controller of the related art, the detection data from the low-speed communication sensor is transmitted at a constant cycle, which is not in synchronization with the rotation of the internal combustion engine.

In the related art controller described above, since the detection data from a communication unit provided in the sensor for high-speed communication is transmitted at a predetermined rotation angle timing of the internal combustion engine, the internal combustion engine is appropriately controllable based on the detection data.

However, there may be a problem that the processing load of the controller increases because the communication interval of high-speed communication is shortened at the time of high-speed rotation of the internal combustion engine. Also, for example, when various detection data are transmitted and received using a common communication line, such as SPI (Serial Peripheral Interface) communication, the communication timing may be delayed even for the detection data for high-speed communication.

Further, when the communication timing of the detection data for high-speed communication is delayed, the detection data may include an error, which causes a problem of deterioration of the control accuracy of the internal combustion engine. Such a problem may be solved if the detection data can be corrected on the receiving side, but it may be difficult to add rotation angle information of the internal combustion engine indicating detection timing to the detection data for high-speed communication. That is, the detection data cannot be corrected on the receiving side, i.e., on the controller side.

SUMMARY

It is an object of the present disclosure, in one aspect, to provide a controller that controls an internal combustion engine in synchronization with the rotation of the internal combustion engine, which is capable of appropriately controlling the internal combustion engine without synchronizing the transmission timing of the detection data from the sensor with the rotation of the internal combustion engine.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
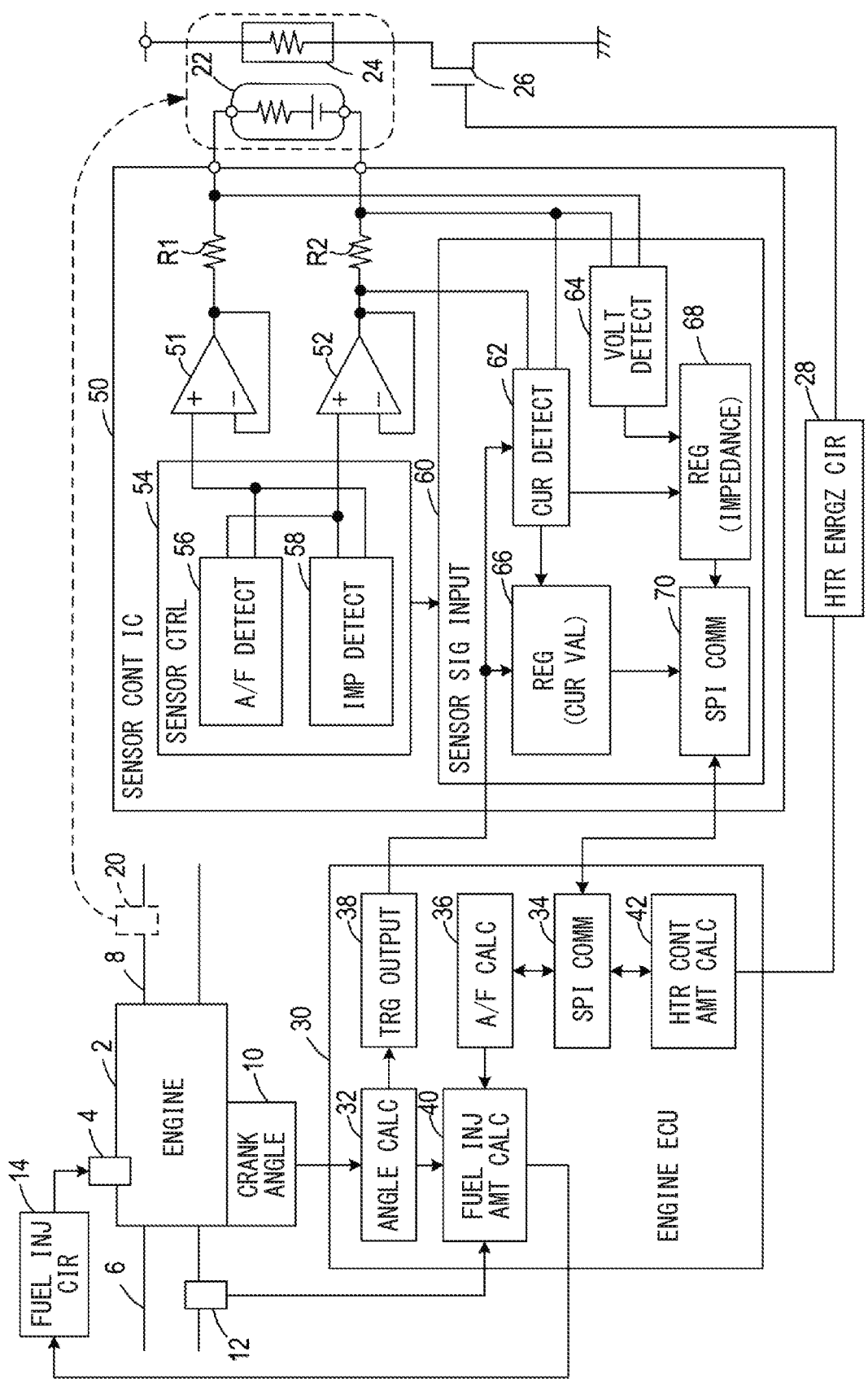
FIG. 1 is a block diagram of an overall configuration of a controller of an internal combustion engine according to an embodiment.

Embodiments of the present disclosure will be described below. As shown in FIG. 1, a controller of an internal combustion engine according to the present embodiment controls a fuel injection amount from a fuel injection device 4 that injects and supplies fuel to each cylinder of an engine 2 that is an internal combustion engine.

Therefore, the engine 2 is provided with a crank angle sensor 10 that generates a pulse signal at every predetermined rotation angle of a crankshaft, and an intake pipe 6 of the engine 2 is provided with an intake air pressure sensor 12 that detects a pressure of intake air as a load of the engine 2.

Further, an exhaust pipe 8 of the engine 2 is provided with an A/F sensor 20 that is a sensor of the present disclosure. Note that, A/F represents an air-fuel ratio of a fuel mixture air supplied to the engine 2.

The A/F sensor 20 includes, for example, a sensor element 22 made by forming porous electrodes on front and back surfaces of a solid electrolyte body such as zirconia, and a heater 24 that heats and activates the sensor element 22.

The sensor element 22 is attached to the exhaust pipe 8 so that one electrode is exposed to the exhaust and the other electrode is exposed to the outside air, and is used as a so-called limit-current type A/F sensor.

That is, the sensor element 22 is configured to cause a limit current to flow between the electrodes with an application of a predetermined DC voltage between the electrodes, thereby a value of the limit current continuously changes from lean to rich according to a degree of oxygen concentration in the exhaust.

Therefore, a DC voltage for A/F detection is applied to the sensor element 22 from a sensor control IC 50, and an electric current corresponding to the A/F is detected on the sensor control IC 50 side. Note that the limit current type A/F sensor and a principle of A/F detection using the A/F sensor are well-known techniques, and thus detailed description thereof is omitted from the specification.

In addition, the heater 24 is provided on an energization path from a DC power source so as to generate heat upon receiving power supply from the DC power source such as an in-vehicle battery. On such energization path, a switching element 26 for energization control is provided in series with the heater 24.

When the switching element 26 is turned ON/OFF by a heater energization circuit 28, the amount of heat generated by the heater 24, i.e., temperature of the sensor element 22 in other words, is controlled. Note that heater control described above is performed by an engine ECU 30 serving as a control unit of the present disclosure.

The engine ECU 30 is an electronic control device for engine control mainly composed of a microcomputer including a CPU, a ROM, a RAM, and the like, and has various functions shown in the drawing.

That is, the engine ECU 30 functions as an angle calculation unit 32, an SPI communication unit 34, an A/F calculation unit 36, a trigger output unit 38, a fuel injection amount calculation unit 40, and a heater control amount calculation unit 42, according to a program executed by a microcomputer or a control circuit.

Here, the angle calculation unit 32 calculates a rotation angle of the engine 2 based on a pulse signal from the crank angle sensor 10.

Further, the SPI communication unit 34 performs SPI communication with the sensor control IC 50 to obtain an A/F detection data detected by the A/F sensor 20 and an impedance of the sensor element 22.

In addition, the A/F calculation unit 36 calculates A/F based on the A/F detection data obtained by the SPI communication unit 34.

Then, the fuel injection amount calculation unit 40 calculates a target fuel injection amount based on a rotation speed of the engine 2 obtained from the rotation angle calculated by the angle calculation unit 32, an intake air pressure detected by the intake air pressure sensor 12, the A/F calculated by the A/F calculation unit 36, and the like.

Further, the fuel injection amount calculation unit 40 drives the fuel injection device 4 via a fuel injection circuit 14 at a predetermined injection timing in synchronization with the rotation of the engine 2, so that the amount of fuel injected and supplied from the fuel injection device 4 to each cylinder of the engine 2 becomes the target fuel injection amount.

Note that the injection timing from the fuel injection device 4 is set based on the rotation angle of the engine 2 calculated by the angle calculation unit 32.

Next, the trigger output unit 38 detects a predetermined A/F detection timing in synchronization with the rotation of the engine 2 from the rotation angle calculated by the angle calculation unit 32, and outputs a trigger signal to the sensor control IC 50 that serves as a detector in the present disclosure.

The trigger signal transmitted to the sensor control IC 50 is a signal for notifying the sensor control IC 50 of a timing at which the electric current flowing in the sensor element 22 is stored as the A/F detection data in a register 66 that serves as a storage.

Further, the heater control amount calculation unit 42 calculates a control amount of the heater 24 based on the impedance of the sensor element 22 obtained from the sensor control IC 50 by the SPI communication unit 34.

That is, in order to detect A/F with the A/F sensor 20, it is necessary to activate the sensor element 22 by heating it to an activation temperature of about 700° C., for example. Further, the impedance of the sensor element 22 changes with temperature.

Therefore, the heater control amount calculation unit 42 calculates a drive duty ratio of the switching element 26 as the control amount of the heater 24, so that the impedance of the sensor element 22 becomes a desired impedance as the temperature changes.

Then, the heater control amount calculation unit 42 controls an electric current flowing in the heater 24 by turning ON and OFF the switching element 26 via the heater energization circuit 28 at the calculated drive duty ratio, thereby controlling the amount of heat generated by the heater 24 and temperature thereof.

Next, the sensor control IC 50 is provided with operational amplifiers 51 and 52 for applying a voltage to each of the electrodes of the sensor element 22 of the A/F sensor 20 via resistors R1 and R2, respectively.

The operational amplifiers 51 and 52 are configured as so-called buffer circuits by having a connection between an output terminal and an inverted input terminal (−), and apply, to each of the electrodes of the sensor element 22, a voltage corresponding to an input voltage from a sensor controller 54 to a non-inverted input terminal (+).

The sensor controller 54 includes an A/F detection control unit 56 and an impedance detection control unit 58.

Figure 2:
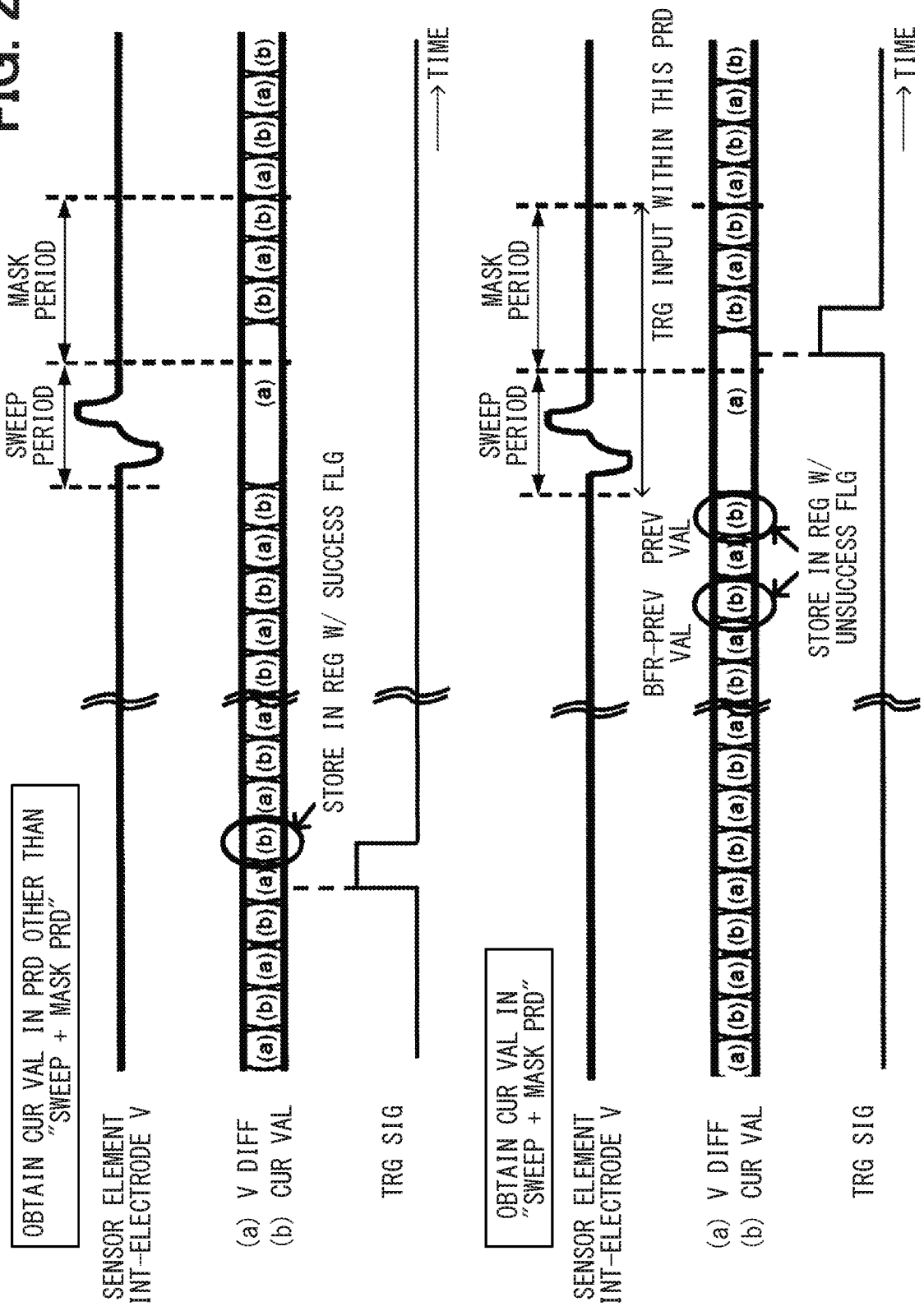
FIG. 2 is an explanatory diagram of an operation for obtaining an A/F detection data in a sensor control IC.

Among these, as shown in FIG. 2, the A/F detection control unit 56 is configured to apply a predetermined direct current (DC) voltage for A/F detection to a position between the electrodes of the sensor element 22 (i.e., SENSOR ELEMENT INT-ELECTRODE V in FIG. 2) via the operational amplifiers 51 and 52 during a normal period in which the A/F is detectable.

Further, the impedance detection control unit 58 changes an input voltage to the operational amplifiers 51 and 52 on behalf of the A/F detection control unit 56 during a fixed sweep period in a predetermined fixed cycle.

More specifically, the impedance detection control unit 58 applies a voltage for impedance detection to a position between the electrodes of the sensor element 22, during the sweep period, by alternately changing the application voltage to the sensor element 22 from a DC voltage at the A/F detection time to a negative voltage side and to a positive voltage side.

Note that the sensor controller 54 is implemented as a programmable control circuit such as a microcomputer, an ASIC or the like, and the function thereof as the impedance detection control unit 58 is realized only during a fixed sweep period in a predetermined cycle.

Further, the sensor control IC 50 is provided with a sensor signal input unit 60 that measures a current value indicating the A/F and the impedance of the sensor element 22 under control of the sensor controller 54 and stores the measurement data as detection data to be transmitted to the engine ECU 30.

The sensor signal input unit 60 includes a current detector 62, a voltage detector 64, registers 66 and 68, and an SPI communication unit 70. The current detector 62 is configured to detect the electric current flowing in the sensor element 22 from a voltage across the resistor R2 provided on the energization path to the sensor element 22, and the voltage detector 64 is configured to detect a voltage difference between both terminals of the sensor element 22.

Note that the current detector 62 and the voltage detector 64 are implemented as a microcomputer, an ASIC or the like in common with the sensor controller 54, and alternately detect the current value and the voltage difference at a shorter constant cycle shorter than the sweep period during the normal period except for the sweep period, as shown in FIG. 2. Therefore, the current detector 62 cyclically obtains a current value, which is the A/F detection data, at a shorter interval than an output interval of the trigger signal from the engine ECU 30.

Figure 3:
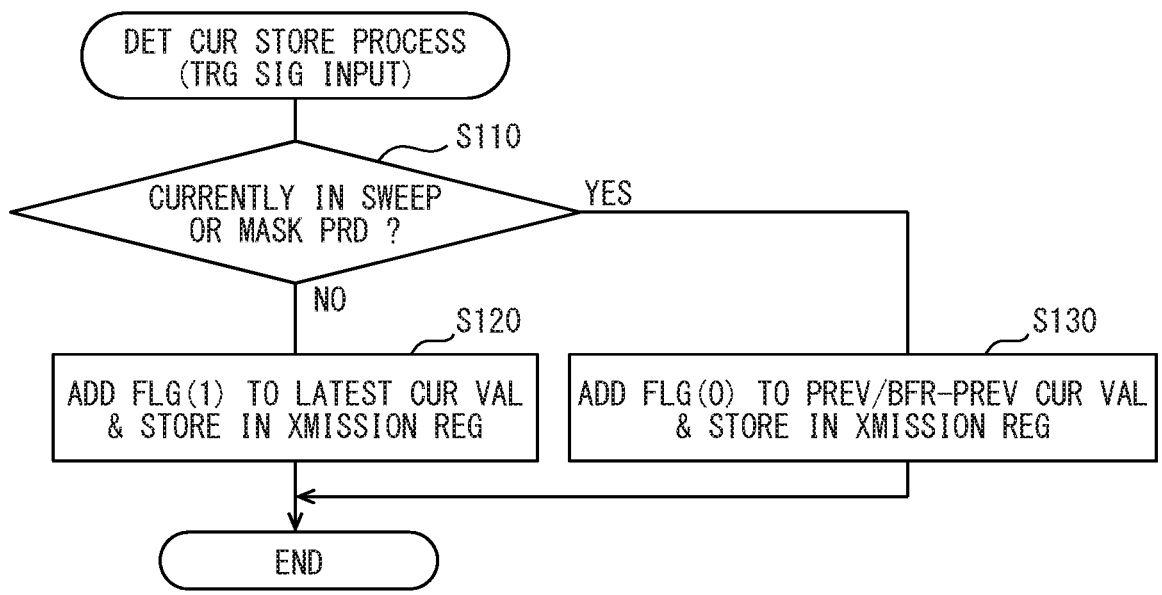
FIG. 3 is a flowchart of a detected current storing process performed by a current detector.

Then, when a trigger signal is input from the engine ECU 30, the current detector 62 performs a detected current storage process shown in FIG. 3 to store a detected current value in the register 66 as the A/F detection data.

Further, the impedance detection control unit 58 calculates the impedance of the sensor element 22 based on the current value detected by the current detector 62 and the voltage value detected by the voltage detector 64 during the sweep period, and saves the calculated impedance to the register 68.

Then, the SPI communication unit 70 transmits, to the engine ECU 30, the current value stored in the register 66 or the impedance stored in the register 68 in accordance with a detection data request signal transmitted from the SPI communication unit 34 of the engine ECU 30.

Therefore, the engine ECU 30 can control the sensor control IC 50 to store the current value as the A/F measurement result in the register 66 at the predetermined rotation angle timing of the engine 2 by outputting the trigger signal. Further, the current value stored in the register 66 can be obtained at an arbitrary communication timing. Further, the impedance of the sensor element 22 can also be obtained at an arbitrary communication timing.

Therefore, it is not necessary for the engine ECU 30 to control the A/F sensor 20 in synchronization with the rotation of the engine 2 for obtaining the detection data of the A/F and the impedance as in the conventional case, thereby preventing an increase in the processing load at the high-speed rotation time of the engine 2.

In the meantime, in the sensor control IC 50, the impedance detection control unit 58 changes the application voltage between the electrodes of the sensor element 22 during the sweep period that occurs at a constant cycle, thereby the detected current value does not correspond to the A/F.

In addition, after the lapse of the sweep period, even when the A/F detection control unit 56 applies a DC voltage for A/F detection between the electrodes of the sensor element 22, it takes a certain amount of time until the electric current corresponding to the A/F flows in the sensor element 22.

Therefore, as shown in FIG. 2, by setting such a period of time as a mask period, the current detector 62 changes the current value to be store in the register 66 among two cases, i.e., a first case of when a trigger signal is input during the sweep period and the mask period, and a second case of when a trigger signal is input during other period other than the above, i.e., during an A/F detection period.

In other words, when a trigger signal is input from engine ECU 30, the current detector 62 performs a detected current store process shown in FIG. 3.

In the detected current store process, first, in S110, it is determined whether or not it is currently in a sweep period or a mask period after the sweep period.

If it is currently not in the sweep period or in the mask period, that is, if it is in the A/F detection period, the process proceeds to S120, and if it is currently in the sweep period or in the mask period, the process proceeds to S130.

Figure 4:
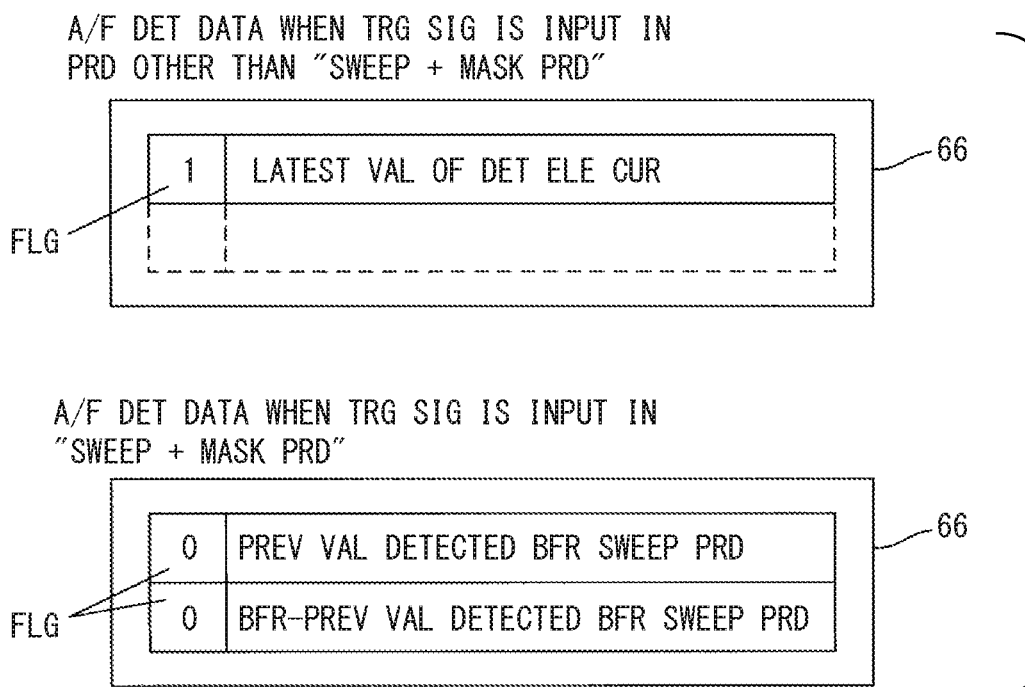
FIG. 4 is an explanatory diagram of the A/F detection data stored in a register in a sensor signal input unit.

In S120, since it is currently not in the sweep period nor in the mask period, a latest current value is detected by the current detector 62 and is stored in the register 66 as the A/F detection data as shown in an upper part of FIGS. 2 and 4, and the detected current store process is terminated.

Note that, when the A/F detection data is stored in the register 66 in S120, the detection data includes a value "1" as a flag indicating that the current value is (i.e., has been detected as) the latest value of the detected electric current in synchronization with the trigger signal as shown in FIG. 4.

Further, in S130, since it is currently in the sweep period or in the mask period, the current values detected in the past two cycles by the current detector 62 before the sweep period are stored in the register 66 as a previous value and a value before previous value (e.g., PREV VAL and BFR-PREV VAL in FIG. 2), and the detected current store process is terminated, as shown in a lower part of FIG. 2 and in a lower part of FIG. 4.

Note that, when the A/F detection data is stored in the register 66 in S130, the detection data indicates that the current value includes a value "0" as a flag indicating that the current value is the previous value and the value before previous value which are not in synchronization with the trigger signal as shown in FIG. 4.

Then, the A/F detection data stored in the register 66 in the above-described manner is transmitted from the SPI communication unit 70 to the engine ECU 30 in response to a request from the engine ECU 30.

Figure 5:
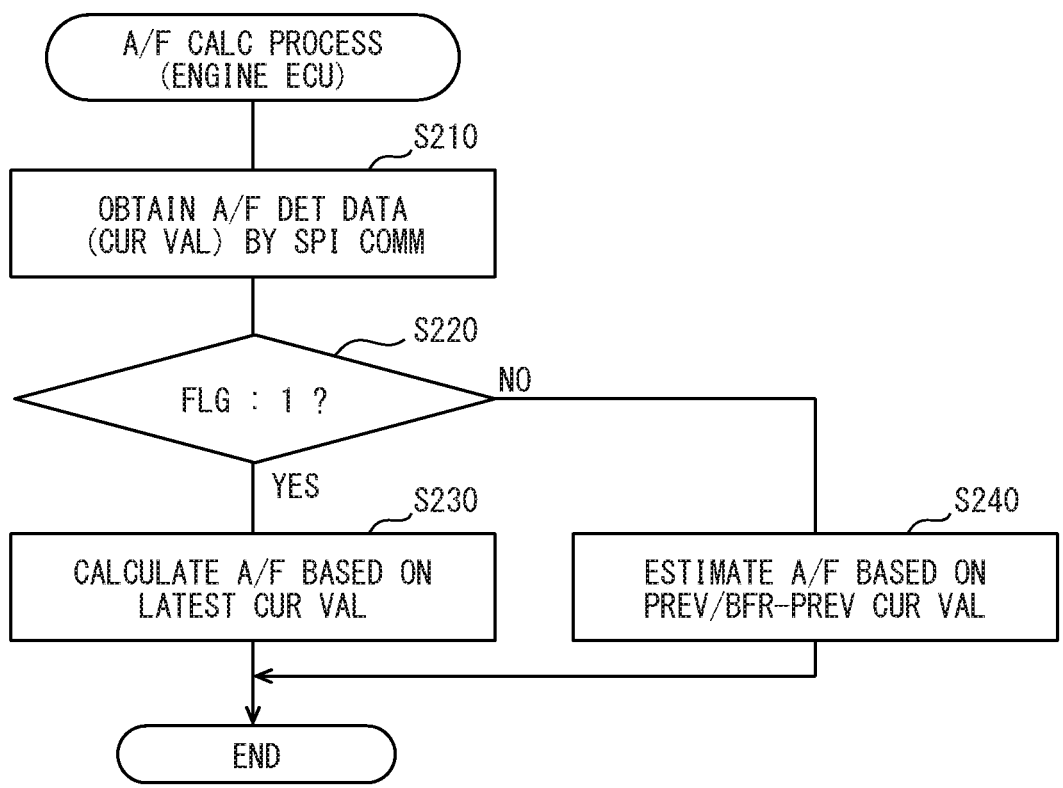
FIG. 5 is a flowchart of an A/F calculation process performed by an engine ECU.

On the other hand, in the engine ECU 30, the function as the A/F calculation unit 36 is realized by performing an A/F calculation process by the computer as shown in FIG. 5.

In the A/F calculation process, first, in S210, the engine ECU 30 obtains the A/F detection data via the SPI communication unit 34, by causing the SPI communication unit 34 to output a request signal for the A/F detection data to the sensor control IC 50.

Next, in S220, it is determined whether the detection data obtained in S210 is given a flag of value "1."

If it is determined in S220 that the flag of value "1" is added to the detection data, the current value of the detection data is a current value detected in synchronization with the trigger signal, thereby shifting the process to S230, calculating the A/F from the current value, and the A/F calculation process is terminated.

If it is determined in S220 that the flag of value "1" is not added to the detection data, in other words, if the flag has a value "0," the process proceeds to S240.

Then, in S240, the A/F obtainable at an input timing of the trigger signal is estimated based on the two current values included in the detection data obtained in S210, that is, based on the previous value and the value before previous value, and the A/F calculation process is terminated.

That is, since the previous value and the value before previous value respectively included in the detection data correspond to the A/F before the sweep period, the A/F at a timing that is in synchronization with the trigger signal is estimated based on (i) the amount of change in the electric current from the value before previous value to the previous value and (ii) the previous value.

As a result, in the fuel injection amount calculation unit 40, the fuel injection amount is controllable for adjusting the A/F of the fuel mixture air to be supplied to each cylinder of the engine 2 based on the A/F calculated or estimated by the A/F calculation unit 36.

As described above, in the controller of the present embodiment, when a trigger signal is input from the engine ECU 30 to the sensor control IC 50, the current detector 62 stores the current value that is the detection result of the A/F as the detection data in the register 66. Then, the detection data stored in the register 66 is transmitted from the sensor control IC 50 to the engine ECU 30 in accordance with a request from the engine ECU 30.

Therefore, there is no need for the engine ECU 30 to perform communication with the sensor control IC 50 at every predetermined rotation angle of the engine 2, for obtaining the detection data as the data of the A/F that is detected at a predetermined rotation angle timing in synchronization of the rotation of the engine 2. Therefore, the processing load on the engine ECU 30 reducible.

Further, the sensor control IC 50 performs detection of the A/F by using the sensor element 22 and detection of the impedance of the sensor element 22 in a time division manner. Therefore, the calculation of the A/F from the current value detected by the current detector 62 performable in a first period, which is a period other than the sweep period and the mask period, is not performable in a second period, which is a combined period of the sweep period for the impedance detection and the mask period.

On the other hand, when a trigger signal is input in the second period, the current detector 62 of the sensor control IC 50 stores, in the register 66, the latest two current value from the past two cycles detected by the current detector 62 in the first period prior to the second period as the previous value and the value before previous value.

Then, in case that the A/F detection data obtained from the sensor control IC 50 is made up from two current values of the previous value and the value before previous value, the engine ECU 30 estimates, based on the two current values, the A/F at a rotation angle timing at which a trigger signal is output.

Therefore, the engine ECU 30 is enabled to obtain the A/F at the output timing of a trigger signal, not only in the first period during which the A/F detection data is obtainable on the sensor control IC 50 side, but also in the second period during which the A/F detection data is NOT obtainable.

Therefore, the engine ECU 30 can improve a control accuracy of the engine 2, due to the calculation of the fuel injection amount by using the A/F detected at the predetermined rotation angle timing of the engine 2.

In particular, the current detector 62 of the sensor control IC 50 assigns two different flags respectively to the detection data stored in the register 66 in the first period during which the A/F detection data is obtainable and to the detection data stored in the register 66 in the second period during which the A/F detection data is not obtainable.

Therefore, when the A/F detection data is obtained from the sensor control IC 50 by the SPI communication, it can be determined on the engine ECU 30 side whether the A/F is calculable or estimatable from the current value of the detection data. Therefore, according to the controller of the present disclosure, the processing load for such determination is reducible.

Note that, in the engine ECU 30 serving as the control unit of the present disclosure, the SPI communication unit 34 and the A/F calculation unit 36 correspond to a detection data receiver of the present disclosure. Further, in the sensor control IC 50 serving as a detector of the present disclosure, the current detector 62 corresponds to a detection data obtainer of the present disclosure, and the register 66 corresponds to a storage of the present disclosure, and the SPI communication unit 70 corresponds to a detection data transmitter.

Though the embodiment of the present disclosure has been described, the present disclosure is not limited to the embodiment described above and can be modified in various manners.

For example, in the above embodiment, the A/F sensor 20 has been described as an example of the sensor that needs to detect the drive state of the engine 2 at a predetermined rotation angle timing in synchronization with the rotation of the engine 2. However, an in-cylinder pressure sensor that detects a pressure in the cylinder of the engine 2, for example, can be usable in the same manner as the sensor of the present disclosure.

That is, in other words, when a technique of the present disclosure is applied to a method of obtaining the detection data from a sensor that detects a drive state that changes in synchronization with the rotation of the engine 2, the same effects described in the above embodiment are obtainable.

In the description of the above embodiment, the engine ECU 30 as a control unit is implemented as a microcomputer, and each of the functions of the engine ECU 30 is realized by a program executed by the computer.

On the other hand, the functions of the control unit of the present disclosure may be configured to realize in part or as a whole by using plural pieces of hardware. Further, the functions of the sensor controller 54, the current detector 62, the voltage detector 64, and the like in the sensor control IC 50 serving as a detector may also be realized in part or as a whole by using plural pieces of hardware.

In addition, a plurality of functions realized by one element in the above embodiment may instead be realized cooperatively by a plurality of elements, or a single function realized by one element may instead be realized by a plurality of elements. Further, a plurality of functions realized by a plurality of elements may also be realized by one element, or one function realized by a plurality of elements may also be implemented by one element. Further, a part of the above configuration of the above embodiment may be omitted. Further, at least a part of the above configuration of the above embodiment may be added to the configuration of the other embodiments described above or may be replaced with the configuration of the other embodiments described above.

Further, the present disclosure may also be realized in various forms such as a program for operating a computer to function as a control unit or a detector, as a non-transitory, substantive recording medium such as a semiconductor memory storing such a program, or as a control method of an internal combustion engine, other than a controller of an internal combustion engine.

What is claimed is:

1. A controller of an internal combustion engine comprising:
   a sensor configured to detect a predetermined drive state of the internal combustion engine;
   a control unit configured to control a drive of the internal combustion engine based on detection data representing the drive state detected by the sensor; and
   a detector configured to transmit the detection data to the control unit after obtaining the detection data from the sensor, wherein
   the detector includes:
      a detection data obtainer configured to obtain the detection data from the sensor and store the detection data in a storage when a trigger signal is input from the control unit; and
      a detection data transmitter configured to transmit the detection data stored in the storage to the control unit by performing a data communication with the control unit, and
   the control unit includes:
      a trigger output unit configured to output the trigger signal to the detector at a predetermined rotation angle timing in synchronization with a rotation of the internal combustion engine; and a detection data receiver configured to obtain the detection data stored in the storage from the detector by performing the data communication with the detector, the detector operates in a first period and in a second period, the first period allowing the detector to obtain the detection data from the sensor, and the second period not allowing the detector to obtain the detection data from the sensor, the detection data obtainer is configured to, during the first period, cyclically obtain the detection data from the sensor at an interval shorter than an output interval of the trigger signal from the control unit, upon having an input of the trigger signal from the control unit in the first period, store a latest value of the detection data obtained from the sensor in the storage, and upon having an input of the trigger signal from the control unit in the second period, store latest two values of the detection data obtained during the first period in the storage as a previous value and a value before previous value, and the detection data receiver in the control unit is configured to obtain either (i) the latest value stored in the storage or (ii) the previous value and the value before previous value stored in the storage, as the detection data by performing the data communication with the detector.

2. The controller of an internal combustion engine of claim 1, wherein the detection data obtainer is configured to assign, to the detection data, information representing that the detection data is either (i) the latest value or (ii) the previous value and the value before previous value when storing the detection data in the storage according to an input of the trigger signal.

3. The controller of an internal combustion engine of claim 1, wherein the detection data receiver is configured to estimate the latest value of the detection data obtained at a trigger signal input timing based on the previous value and the value before previous value when the detection data obtained from the detector is the previous value and the value before previous value.

4. The controller of an internal combustion engine of claim 1, further comprising a sensor element, the sensor element including at least two electrodes, wherein the sensor element is attached to an exhaust pipe so that a first electrode is exposed to the exhaust pipe and a second electrode is exposed to outside air, for use as a limit-current A/F sensor.

5. The controller of an internal combustion engine according to claim 4, wherein the at least two electrodes are porous electrodes disposed on front and back surfaces of a solid electrolyte body.

* * * * *